United States Patent [19]

Sayles

[11] 3,967,444

[45] July 6, 1976

[54] TECHNIQUE FOR PREVENTING AFTERBURNING OF THE INERT COMPONENTS OF SOLID-PROPELLED ROCKET MOTORS BY USING FORMAMIDINESULFINIC ACID IN THE BINDER OF THE INERT COMPONENTS

[75] Inventor: David C. Sayles, Huntsville, Ala.

[73] Assignee: The United States of America as represented by the Secretary of the Army, Washington, D.C.

[22] Filed: Sept. 30, 1974

[21] Appl. No.: 510,517

[52] U.S. Cl............................. 60/255; 60/200 A; 102/103
[51] Int. Cl.$^2$.......................................... F02K 9/04
[58] Field of Search................. 60/253, 255, 200 A; 102/103

[56] References Cited
UNITED STATES PATENTS

| | | | |
|---|---|---|---|
| 3,166,896 | 1/1965 | Breitengross et al. | 102/103 X |
| 3,507,114 | 4/1970 | Webb | 102/103 X |
| 3,578,520 | 5/1971 | Dolan et al. | 60/255 X |
| 3,855,176 | 12/1974 | Skidmore | 102/103 X |

Primary Examiner—William L. Freeh
Assistant Examiner—Robert E. Garrett
Attorney, Agent, or Firm—Nathan Edelberg; Robert P. Gibson; Jack W. Voigt

[57] ABSTRACT

Formamidinesulfinic acid (thiourea dioxide) is employed as an additive to inert motor components of solid-propelled rocket motors to eliminate afterburning which is defined as the combustion of gases (produced by the pyrolysis of the inert motor components) with the air ingested into the rocket motor due to the free convective circulation after motor burnout.

9 Claims, No Drawings

TECHNIQUE FOR PREVENTING AFTERBURNING OF THE INERT COMPONENTS OF SOLID-PROPELLED ROCKET MOTORS BY USING FORMAMIDINESULFINIC ACID IN THE BINDER OF THE INERT COMPONENTS

DEDICATORY CLAUSE

The invention described herein may be manufactured, used, and licensed by or for the Government for governmental purposes without the payment to me of any royalties thereon.

BACKGROUND OF THE INVENTION

Numerous exploratory programs in propulsion have resulted in the development of high-performance smokeless propellants; however, the development of inert components which do not contribute to smoke in the exhaust after the propellant has been consumed has been overlooked to a large extent. The inert components can be identified as mainly the liner, insulation, and other thermal barriers. The liner is the intermediate chemical film or strata which bonds the motor wall or wall insulation to the propellant grain. In the past, the liner materials and the insulation materials have produced amounts of smoke from pyrolysis and ablation after burnout of the propellant which can sometimes exceed that produced by the propellant itself.

It is apparent that the advantages of a high-performance smokeless propellent would be off-set by a major afterburning condition which produced smoke of a substantial amount.

Therefore, an object of this invention is to provide a chemical additive which is effective in functioning to prevent smoldering of the liner, and by thus preventing smoldering of the liner, the pyrolysis and ablation of the insulation material would not be a problem.

Another object of this invention is to provide a liner composition with an afterburning retardant for use with composite propellant grains.

A further object of this invention is to provide a liner composition with an afterburning retardant for use with double-base propellant grains.

SUMMARY OF THE INVENTION

A new use for formamidinesulfinic acid (thiourea dioxide) relates to its use in inert components of rocket motors to prevent afterburning. The chemical is most effective in functioning to prevent smoldering of the liner which is comprised of an intermediate film or strata which bonds the motor wall or wall insulation to the propellant. The formamidinesulfinic acid is effective as an afterburning retardant for liners employed with composite propellants or double-base propellants.

When formamidinesulfinic acid is used as an afterburning retardant for a composite propellant motor case liner composition, it is used to replace carbon black and titanium dioxide which is generally used in equal amounts to total about 35 to 45 weight percent of the liner composition.

When formamidinesulfinic acid is used as an afterburning retardant for a double-base propellant motor case liner composition, it is used as an additive in an amount from about 15 to 25 weight percent of the liner composition.

Formamidinesulfinic acid is effective when used in several other applications in addition to its use in motor case liners and insulations to prevent their burning during the tailoff period, and insures greater near-smokelessness. Essentially, formamidinesulfinic acid in combination with a binder and a curing agent for the binder is the basic combination which permits formamidinesulfinic acid to function as an afterburning retardant for a variety of inert rocket motor components.

DESCRIPTION OF THE PREFERRED EMBODIMENT

The use of formamidinesulfinic acid in a liner composition is illustrated in Table I in which Composition A represents a typical liner for composite propellants. Table II illustrates a typical liner, Composition A, for double-base propellants. Composition B, illustrated in Table I and Table II, contains the afterburning retardant, formamidinesulfinic acid.

Figure 1:
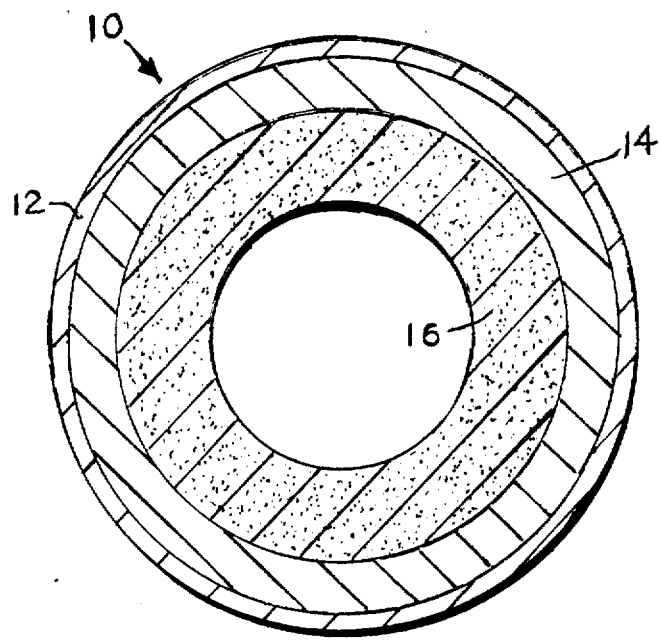
FIG. 1 is a cross sectional view of a solid propellant rocket motor which illustrates an embodiment of this invention.

Referring more specifically to the Figures of the Drawing, in FIG. 1 there is shown a section of a rocket motor 10 having a rocket motor case 12 with a liner material 14 comprised of formamidinesulfinic acid, a binder, and a curing agent for the binder of the liner material which bonds the propellant grain increment 16 to the rocket motor case.

Figure 2:
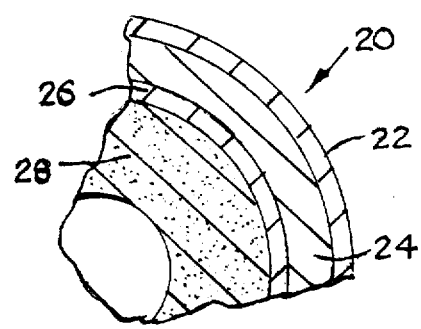
FIG. 2 is a partial section of a solid propellant rocket motor which illustrates a second embodiment of the invention.

In FIG. 2, there is shown a section of a rocket motor 20 having a rocket motor case 22 with insulation 24 bonded to the rocket motor case and with a propellant grain increment 28 bonded to the insulation by a liner material 26 comprised of formamidinesulfinic acid, a binder, and a curing agent for the binder.

Figure 3:
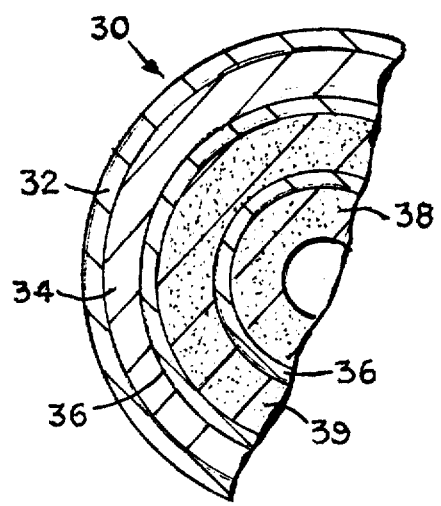
FIG. 3 is a partial section of a solid propellant rocket motor which illlustrates a third embodiment of this invention.

In FIG. 3, there is shown a section of a rocket motor 30 having a rocket motor case 32 with insulation 34 bonded to the rocket motor case and with a propellant grain increment 38 bonded to the insulation with a thermal barrier 36 comprised of formamidinesulfinic acid, a binder, and curing agent for the binder and with another propellant grain increment (also 38) bonded to the propellant grain increment 38 with a thermal barrier 36 as described.

Figure 4:
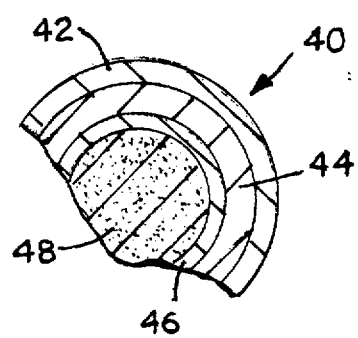
FIG. 4 is a partial section of a solid propellant rocket motor which illustrates a fourth embodiment of this invention.

In FIG. 4, there is shown a section of a rocket motor 40 having a rocket motor case 42 with insulation 44 bonded to the rocket motor case and with an end-burning propellant grain increment 48 bonded to the insulation with a liner material 46 comprised of formamidinesulfinic acid, a binder, and a curing agent for the binder.

The illustrations of the various Figures of the Drawing apply to composite and double-base solid propellant grain motor combinations. Each of the combinations employs formamidinesulfinic acid with a binder and curing agent for the binder in a thermal barrier-liner composition that is compatible with the type solid propellant grain incrementt selected for use for a particular embodiment.

TABLE I

A COMPARISON OF LINERS WITH AND WITHOUT AN AFTERBURNING RETARDANT (FOR COMPOSITE PROPELLANTS)

| INGREDIENT | COMPOSITION (Parts by Weight) A* | B |
|---|---|---|
| Carboxyl-terminated polybutadiene prepolymer (binder) | 60. | 60. |
| 4,5-Epoxycyclohexylmethyl-4,5-epoxy-cyclohexyl carboxylate** (curing agent) | 1.3 | 1.3 |
| Carbon Black | 20. | |
| Titanium Dioxide | 20. | |
| Formamidinesulfinic acid | | 40. |

*TL-725A (MAPO replaced by ERL 4221).
**ERL 4221 (formerly UNOX 221).

TABLE II

COMPARISON OF LINERS WITH AND WITHOUT AN AFTERBURNING RETARDANT (FOR DOUBLE-BASE PROPELLANTS)

| INGREDIENT | COMPOSITION (Parts by Weight) A** | B |
|---|---|---|
| Polyvinyl formal* (binder) | 10 | 10 |
| Formamidinesulfinic acid | | 20 |
| Toluene | 60 | 60 |
| Ethyl alcohol (95%) | 40 | 40 |
| Ethyl lactate (activator for curing agent) | 15 | 15 |
| Tetraisopropyl titanate/2,4-Pentanedione complex (1 mole/2 moles) (curing agent) | 2 | 2 |

*Formvar 15/955, Shawinigan Resin Co.
**Bondable layer for Crosslinked Double Base Propellant (Hercules, Inc.)

To evaluate the use of formamidinesulfinic acid as an afterburning retardant a series of test firings were made. The level of afterburning which resulted from a series of small motor firings clearly demonstrated the beneficial effects when formamidinesulfinic acid is included as described.

The test firings included loading a composite propellant such as TP-H-8041 into a small test motor designated as 6C-11-5. The insulated motor case was lined with Composition B of Table I for the composite propellant load. When a double-base propellant was to be loaded into the motor the insulated motor case was lined with Composition B of Table II, referred to as the polyvinyl formal liner. The actual testing comprised static firing two or more motors of each different liner propellant formulation at 0° and +165°F.

The evaluation included comparison movie coverage by photographing through the exhaust plume at two different angles (45° and 90°) of a multicolored background screen having black, white, green, and blue panels. Visual sightings during the firing confirmed the photographic evidence. The difference in the smoke signature from the different liners was remarkably clear, and the beneficial effects produced by the additive, formamidinesulfinic acid, was very evident. There was a very short cutoff in propellant-produced smoke when propellant burning ended when the special liner surface employing compositions B of Table I and Table II was exposed.

The effectiveness of formamidinesulfinic acid as an afterburning retardant may be based on the following phenomena:

1. any smoldering of the liner would cause the formamidinesulfinic acid to become exposed to the hot gases and cause the afterburning retardant to undergo thermal degradation. The degradation process results in the generation of water and nitrogen at the smoldering interface and would stifle the smoldering; and, 2. the rate of reaction of formamidinesulfinic acid with either molecular or ionic oxygen is low unless catalyzed.

Formamidinesulfinic acid is described in the paper "Dibenzenechromium and its Homologs as Catalysts for Some Reduction Reactions" by D. D. Mozzhukkin, B. G. Grebov, G. A. Tychin, A. S. Strizhkova, and M. L. Khidekel, Institute of Chemical Physics, Bulletin of Academy of Sciences of the USSR, 163– 165 (1967).

Formamidinesulfinic acid is prepared from thiourea (1 mole) and peracetic acid (2 moles) below 20°C or by oxidization with $H_2O_2$ in neutral aqueous alcoholic or aqueous solution. U.S. Pat. No. 2,150,921 (1937) describes its preparation by the action of $H_2O_2$ on aqueous solution of an equilibrium mixture of thiourea and ammonium thiocyanate at 10°–30°. U.S. Pat. No. 2,347,446 (1942) treats the same synthesis. Formamidinesulfinic acid is stable and begins to decompose at 142°C (288°F).

Formamidinesulfinic acid is being used as a stabilizer in insecticides (U.S. Rubber, U.S. Pat. No. 2,291,262 (1941)) in the formation of dyes (du Pont, U.S. Pat. No. 2,164,930 Beil. Band III, Drettes Erganzungswerk, P. 148).

In addition to the use of formamidinesulfinic acid in motor case liners and insulation, the afterburning retardant is useful in several other applications to insure greater near-smokelessness by preventing burning during the tailoff period. These applications are:

a. In rocket motors which contain embedded thermal barriers. These barriers function to provide preprogrammed increments of thrust in that they partition the propellant into increments. The barrier serves to prevent the ignition of the next increment of propellant unless it has been eroded away by a gas generant.

b. In rocket motors which contain selectively inhibited areas in the propellant matrix, and thus provide multithrust levels of propulsion.

c. Insulation for end-burning grains, such as, sustainer motors, gas generators, etc. where the insulation is exposed to the hot combustion gases for long durations.

d. In post-boost propulsion controllable motors to prevent smoldering of the extinguished propellant after the chamber pressure has been dropped to below the critical pressure. This would insure the delivery of impulse increments in a more uniform and reproducible manner over the entire range of the motor free volume.

Since formamidinesulfinic acid serves as a burning retardant when used in combination with the inert motor components, it can be used as a substitute for or as an additive to the major component material. For example, the liner material for composite propellant rocket motors has a binder such as carboxyl-terminated polybutadiene prepolymer which is curable with a curative such as 4,564 -epoxycyclohexylmethyl-4,5-epoxycyclohexyl carboxylate. The carbon black and titanium dioxide which is normally used is replaced with formamidinesulfinic acid. The liner material bonds the rocket motor grain to the wall insulation after curing. Thus, the burning grain would be in direct contact with the modified liner composition where the previously described decomposition reaction of formamidinesulfinic acid takes place.

One liner material used with double-base propellant is the bondable layer type which secures the crosslinked double-base propellant grain to the insulation material. Formamidinesulfinic acid is used as an additional ingredient to the binder material, solvents, and curatives which must be compatible and curable to the double-base solid propellant grain and insulation. In this application, illustrated in Table II, the formamidinesulfinic acid is used as an additional ingredient.

I claim:

1. In combination: a solid propellant rocket motor comprising a rocket motor case; one or more solid propellant grain increments disposed within said case; and an inert rocket motor component comprised of formamidinesulfinic acid with a binder and a curing agent for said binder, said inert rocket motor component being in the form of a thermal barrier-liner composition for bonding to said solid propellant grain increment, said formamidinesulfinic acid when in said component being effective in preventing afterburning of said inert rocket motor component.

2. The combination of claim 1 wherein said formamidinesulfinic acid is used in the inert rocket motor component which is a thermal barrier-liner composition for bonding the propellant grain increment to the rocket motor case of a composite propellant rocket motor, said liner composition comprised of a carboxyl-terminated polybutadiene prepolymer binder, a curing agent for said binder of 4,5-epoxycyclohexylmethyl-4,5-epoxycyclohexyl carboxylate, and said formamidinesulfinic acid.

3. The combination of claim 2 wherein said thermal barrier-liner composition is comprised of about 60 parts by weight of said carboxy-terminated polybutadiene prepolymer of about 1.3 parts by weight of said 4,5-epoxycyclohexylmethyl-4,5-epoxycyclohexyl carboxylate, and of about 40 parts by weight of said formamidinesulfinic acid.

4. The combination of claim 1 wherein said formamidinesulfinic acid is used in the inert rocket motor component which is a thermal barrier-liner composition for bonding the propellant grain increment to the rocket motor case of a double-base propellant rocket motor, said liner composition comprised of a binder of polyvinyl formal, toluene, ethyl alcohol, and an activator of ethyl lactate for the curing agent for said binder comprised of tetraisopropyl titanate/2,4-pentanedione complex (1 mole/2 moles), and said formamidinesulfinic acid.

5. The combination of claim 4 wherein said thermal barrier-liner composition is comprised of about 10 parts by weight of said polyvinyl formal, of about 60 parts by weight of said toluene, of about 40 parts by weight of said ethyl alcohol, of about 15 parts by weight of said ethyl lactate, of about 2 parts by weight of said tetraisopropyl titanate/2,4-pentanedione complex (1 mole/2 moles), and of about 20 parts by weight of said formamidinesulfinic acid.

6. The combination of claim 1 wherein said formamidinesulfinic acid is used in the inert rocket motor component which is a thermal barrier-liner composition that is embedded between each of two or more solid propellant grain increments, said thermal barrier-liner composition functioning to prevent the ignition of a second propellant grain increment until said thermal barrier-liner composition has been removed.

7. The combination of claim 1 wherein said solid propellant grain increment is an end-burning solid propellant grain increment and wherein said rocket motor case contains a layer of insulation material bonded to the inside surface thereof and wherein said formamidinesulfinic acid is used in the inert rocket motor component which is a thermal barrier-liner composition for covering and protecting the motor case insulation that is exposed to hot combustion gases for an extended period of time during burning of said end-burning solid propellant grain increment.

8. The combination of claim 1 wherein said rocket motor case contains a layer of insulation material bonded on the inside surface thereof and wherein said formamidinesulfinic acid is used in the inert rocket motor component which is a thermal barrier-liner composition for bonding the solid propellant grain increment to said layer of insulation material of a composite propellant rocket motor, said thermal barrier-liner composition comprised of a carboxyl-terminated polybutadiene prepolymer binder, a curing agent for said binder of 4,5-epoxycyclohexylmethyl-4,5-epoxycyclohexyl carboxylate, and said formamidinesulfinic acid.

9. The combination of claim 1 wherein said rocket motor case contains a layer of insulation material bonded on the inside surface thereof and wherein said formamidinesulfinic acid is used in the inert rocket motor component which is a thermal barrier-liner composition for bonding the solid propellent grain increment to said layer of insulation material of a double-base propellant rocket motor, said thermal barrier-liner composition comprised of a binder of polyvinyl formal, toluene, ethyl alcohol, and an activator of ethyl lactate for the curing agent for said binder comprised of tetraisopropyl titanate/2,4-pentanedione complex (1 mole/2 moles), and said formamidinesulfinic acid.

* * * * *

UNITED STATES PATENT OFFICE
CERTIFICATE OF CORRECTION

PATENT NO. : 3,967,444
DATED : July 6, 1976
INVENTOR(S) : David C. Sayles

Page 1 of 2

It is certified that error appears in the above–identified patent and that said Letters Patent are hereby corrected as shown below:

On Cover Sheet, under Abstract, after "9 claims," cancel "No Drawings" and insert therefor --4 Drawing Figures--.
  The 4 Drawing Figures should appear as shown on the attached sheet.
  Column 2, line 67, "incrementt" should be --increment--.
  Column 4, line 60, "4,564-" should be -- 4,5- --.

Signed and Sealed this

Tenth Day of May 1977

[SEAL]

Attest:

RUTH C. MASON
Attesting Officer

C. MARSHALL DANN
Commissioner of Patents and Trademarks